United States Patent
Ando et al.

(10) Patent No.: US 8,232,009 B2
(45) Date of Patent: Jul. 31, 2012

(54) ELECTRIC STORAGE DEVICE

(75) Inventors: Nobuo Ando, Tokyo (JP); Mitsuru Nagai, Tokyo (JP); Takashi Utsunomiya, Tokyo (JP); Ken Baba, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 383 days.

(21) Appl. No.: 12/506,390

(22) Filed: Jul. 21, 2009

(65) Prior Publication Data
US 2010/0035150 A1    Feb. 11, 2010

(30) Foreign Application Priority Data
Aug. 6, 2008   (JP) .................... 2008-202909

(51) Int. Cl.
*H01M 4/64*   (2006.01)
(52) U.S. Cl. .............. 429/241; 429/152; 429/233
(58) Field of Classification Search .............. 429/241, 429/152
See application file for complete search history.

(56) References Cited

U.S. PATENT DOCUMENTS
6,461,769 B1   10/2002   Ando et al.

FOREIGN PATENT DOCUMENTS
| EP | 1014466 | * | 6/2000 |
| JP | 11-97035 | * | 4/1999 |
| JP | 3485935 B | | 1/2004 |
| KR | 2002-039573 | * | 5/2002 |

* cited by examiner

*Primary Examiner* — John S Maples
(74) *Attorney, Agent, or Firm* — McDermott Will & Emery LLP

(57) ABSTRACT

An electrode laminate unit of an electric storage device includes positive electrodes, negative electrodes and a lithium electrode connected to the negative electrode. When an electrolyte solution is injected into the electric storage device, lithium ions are emitted from the lithium electrode to the negative electrode. A positive and a negative electrode current collector have through-holes that guide the lithium ions in the laminating direction. The aperture ratio of the through-holes at the edge parts where the electrolyte solution is easy to be permeated is set to be smaller than the aperture ratio at central parts in order to suppress the permeation. Thus, the distribution of the electrolyte solution is made uniform, whereby the doping amount is made uniform.

6 Claims, 12 Drawing Sheets

20   POSITIVE ELECTRODE CURRENT COLLECTOR
     (ELECTRODE CURRENT COLLECTOR)
23   NEGATIVE ELECTRODE CURRENT COLLECTOR
     (ELECTRODE CURRENT COLLECTOR)
20a, 23a     THROUGH-HOLE
30a, 31a     EDGE PART (FIRST AREA)
30b, 31b     CENTRAL PART (SECOND AREA)

SMALL ← APERTURE RATIO → GREAT

APERTURE RATIO (CENTRAL PART)
SMALL ←——————→ GREAT

APERTURE RATIO (CENTRAL PART)
SMALL ←——————→ GREAT

CURRENT COLLECTOR LAMINATING STEP

RESIST PRINTING STEP

ETCHING STEP

RESIST REMOVING STEP

FIRST SLURRY APPLICATION STEP: ELECTRODE A

FIRST SLURRY APPLICATION STEP: ELECTRODE B

CURRENT COLLECTOR PEELING STEP

SECOND SLURRY APPLICATION STEP: ELECTRODES A, B

ELECTRIC STORAGE DEVICE

CROSS-REFERENCE TO RELATED APPLICATIONS

The disclosure of Japanese Patent Application No. 2008-202909 filed on Aug. 6, 2008 including the specification, drawings and abstract is incorporated herein by reference in its entirety.

BACKGROUND OF THE INVENTION

1. Field of the Invention

The present invention relates to an electric storage device having an ion source for supplying ions to an electrode mixture layer.

2. Description of the Related Arts

There have been proposed a lithium ion battery or lithium ion capacitor as an electric storage device mounted to an electric vehicle or hybrid vehicle. An electric storage device has been proposed in which a metal lithium foil and a negative electrode are electrochemically in contact with each other in order to enhance an energy density of the electric storage device. Since the metal lithium foil and the negative electrode are brought into contact with each other as described above, lithium ions can be doped beforehand into the negative electrode. Thus, the potential of the negative electrode can be lowered, and the capacitance of the negative electrode can be increased. There has also been proposed an electric storage device having through-holes formed on a positive electrode current collector or a negative electrode current collector in order to smoothly dope lithium ions into the laminated electrodes (see, for example, JP-3485935).

The lithium ions emitted from the metal lithium foil move to the negative electrode via an electrolyte solution. Therefore, when the amount of permeation of the electrolyte solution to the electrode laminate unit varies, the amount of the lithium ions to be doped also varies. Further, small electric current flows to the metal lithium foil from the negative electrode when the lithium ions are doped, so that the lithium ions move from the metal lithium foil toward the negative electrode with the flow of the small electric current. Accordingly, when the current density at each part of the negative electrode varies, the amount of the lithium ions to be doped also varies. The variation in the amount of the lithium ions entails the variation in the potential of the negative electrode, as well as local overcharge or over discharge. Thus, the variation in the amount of lithium ions deteriorates the electric storage device.

SUMMARY OF THE INVENTION

The present invention aims to suppress a variation in an amount of ions to be doped to an electrode.

An electric storage device according to the present invention includes an electrode having an electrode current collector, which is provided with plural through-holes, and an electrode mixture layer provided on the current collector; and an ion source that is connected to the electrode current collector for supplying ions to the electrode mixture layer, wherein the current collector is provided with a first area having a predetermined aperture ratio of the through-holes, and a second area having an aperture ratio of the through-holes greater than that of the first area.

In the electric storage device according to the present invention, the first area is an edge part of the current collector, and the second area is a central part of the current collector.

In the electric storage device according to the present invention, the current collector has a connection part that is connected to the ion source, and the first area is provided closer to the connection part than the second area.

In the present invention, the current collector is provided with the first area having a predetermined aperture ratio of the through-holes, and the second area having an aperture ratio of the through-holes greater than that of the first area. Therefore, the permeation state of the electrolyte solution can be adjusted, whereby ions can uniformly be doped into the electrode. Accordingly, the durability of the electric storage device can be enhanced.

DETAILED DESCRIPTION OF THE PREFERRED EMBODIMENTS

Figure 1:
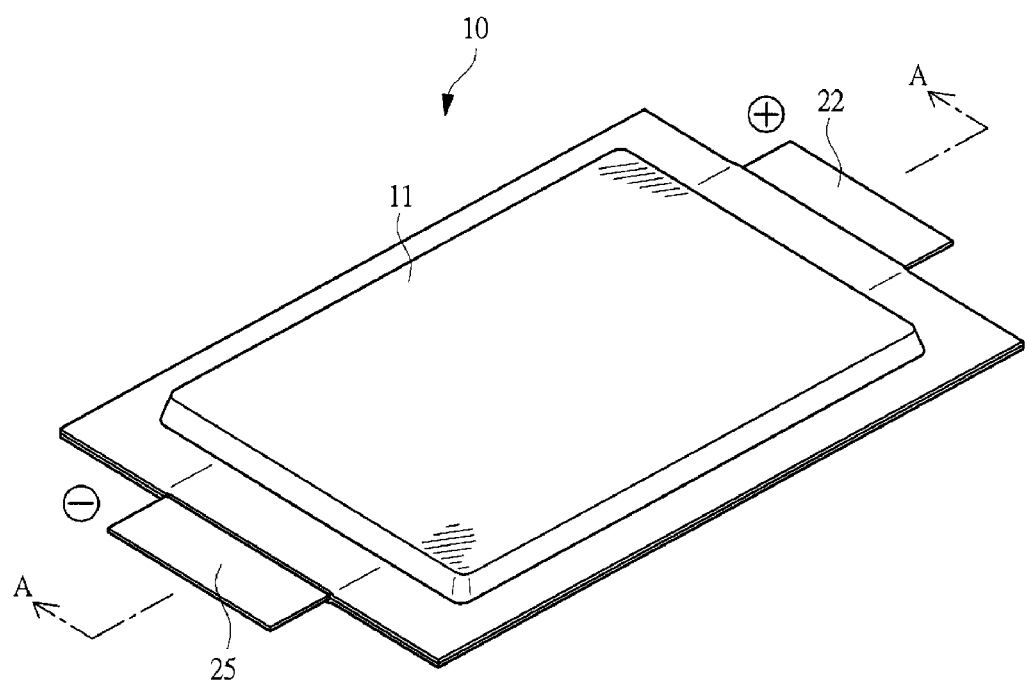
FIG. 1 is a perspective view of an electric storage device according to one embodiment of the present invention.
Figure 2:
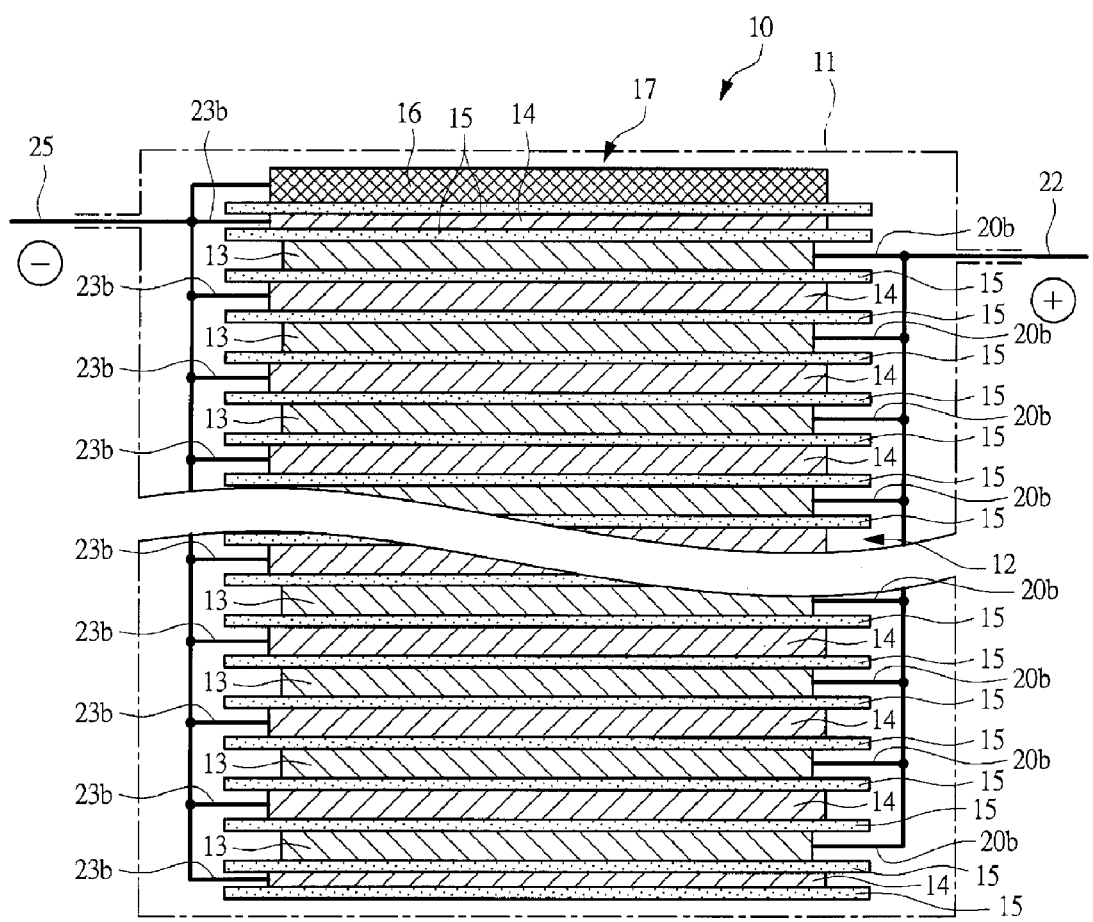
FIG. 2 is a sectional view schematically showing the internal structure of the electric storage device along A-A line in FIG. 1.

FIG. 1 is a perspective view showing an electric storage device 10 according to one embodiment of the present invention. FIG. 2 is a sectional view schematically showing an internal structure of the electric storage device 10 taken along a line A-A in FIG. 1. As shown in FIGS. 1 and 2, an electrode laminate unit 12 is accommodated in a laminate film 11 serving as an outer casing. The electrode laminate unit 12 is composed of positive electrodes 13 and negative electrodes 14 that are laminated in an alternating fashion. A separator 15 is interposed between each of the positive electrodes 13 and each of the negative electrodes 14. A lithium electrode 16 is arranged at the outermost part of the electrode laminate unit 12 so as to be opposite to the negative electrode 14. The separator 15 is provided between the negative electrode 14 and the lithium electrode 16. The electrode laminate unit 12 and the lithium electrode 16 constitute a three-electrode laminate unit 17. An electrolyte solution is injected into the laminate film 11. The electrolyte solution is made of aprotic organic solvent containing lithium salt.

Figure 3:
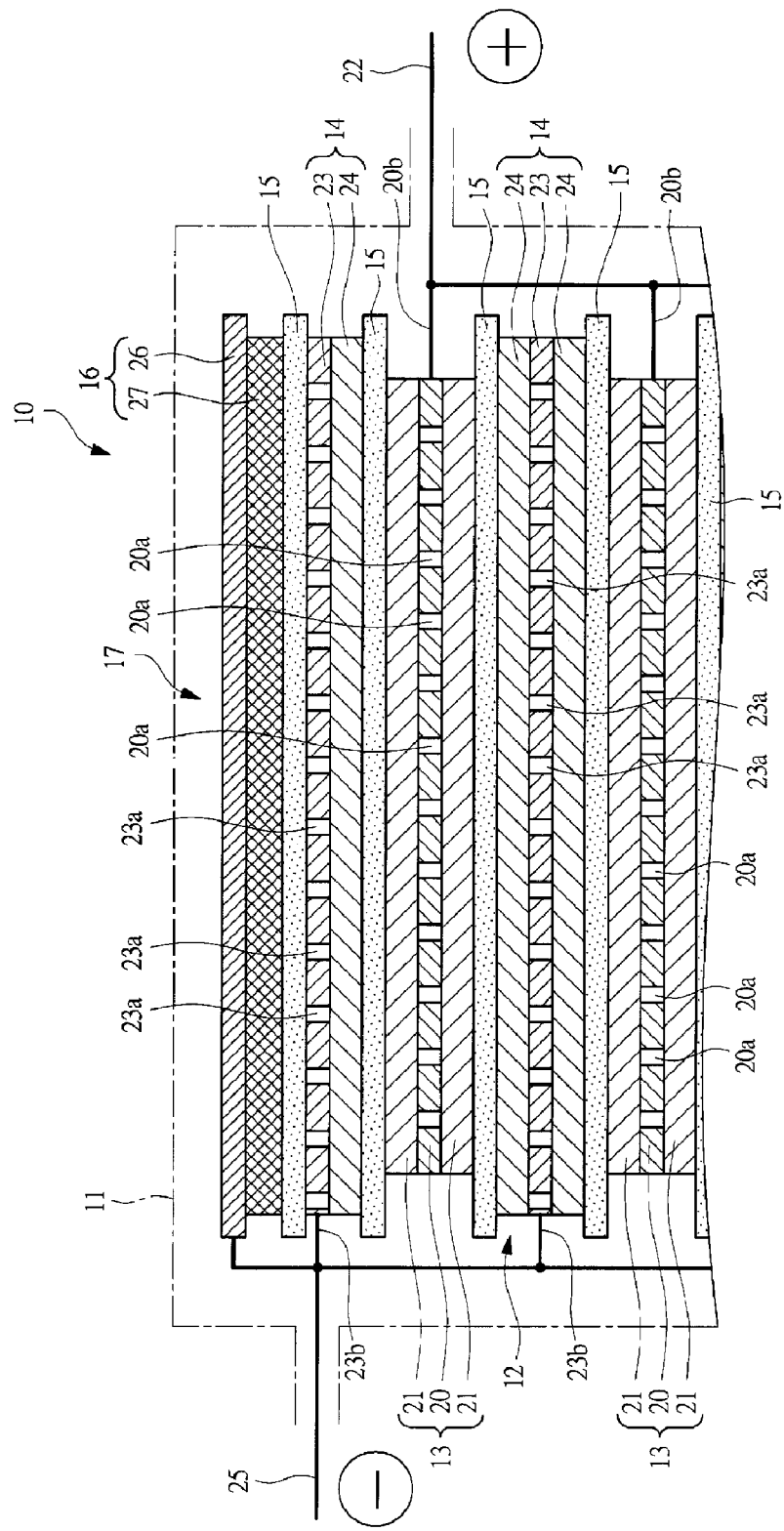
FIG. 3 is a sectional view showing the internal structure of the electric storage device as partially enlarged.

FIG. 3 is a sectional view partially showing the internal structure of the electric storage device 10 as enlarged. As shown in FIG. 3, each of the positive electrodes 13 has a positive electrode current collector (electrode current collector) 20 having a large number of through-holes 20a. A positive electrode mixture layer (electrode mixture layer) 21 is applied onto the positive electrode current collector 20. Terminal welding parts 20b extending in convexly are provided to the positive electrode current collectors 20. Plural terminal welding parts 20b are bonded to each other as superimposed. A positive electrode terminal 22 is connected to the bonded terminal welding parts 20b. Similarly, each of the negative electrodes 14 has a negative electrode current collector (electrode current collector) 23 having a large number of through-holes 23a. A negative electrode mixture layer (electrode mixture layer) 24 is applied onto the negative electrode current collector 23. Terminal welding parts 23b extending convexly are provided to the negative electrode current collectors 23. Plural terminal welding parts 23b are bonded to each other as superimposed. A negative electrode terminal 25 is connected to the bonded terminal welding parts 23b.

The positive electrode mixture layer 21 contains an activated carbon as a positive electrode active material. The activated carbon allows lithium ions or anions to be reversibly doped thereinto and de-doped therefrom. The negative electrode mixture layer 24 contains a polyacene-based organic semiconductor (PAS) as a negative electrode active material. The PAS allows lithium ions to be reversibly doped thereinto and de-doped therefrom. Since the activated carbon is employed as the positive electrode active material and the PAS is employed as the negative electrode active material, the illustrated electric storage device 10 can be functioned as a lithium ion capacitor. It is to be noted that the electric storage device 10 to which the present invention is applied is not limited to the lithium ion capacitor, but can be a lithium ion battery or electric double layer capacitor, or other types of batteries or capacitors. In the specification of the present invention, the term "doping (dope)" involves "occlude", "carry", "absorb" or "insert", and specifically a phenomenon where lithium ions and the like enter the positive electrode active material or the negative electrode active material. The term "de-doping (de-dope)" involves "release" and "desorb", and specifically a phenomenon where lithium ions and the like desorb from the positive electrode active material or the negative electrode active material.

Figure 4:
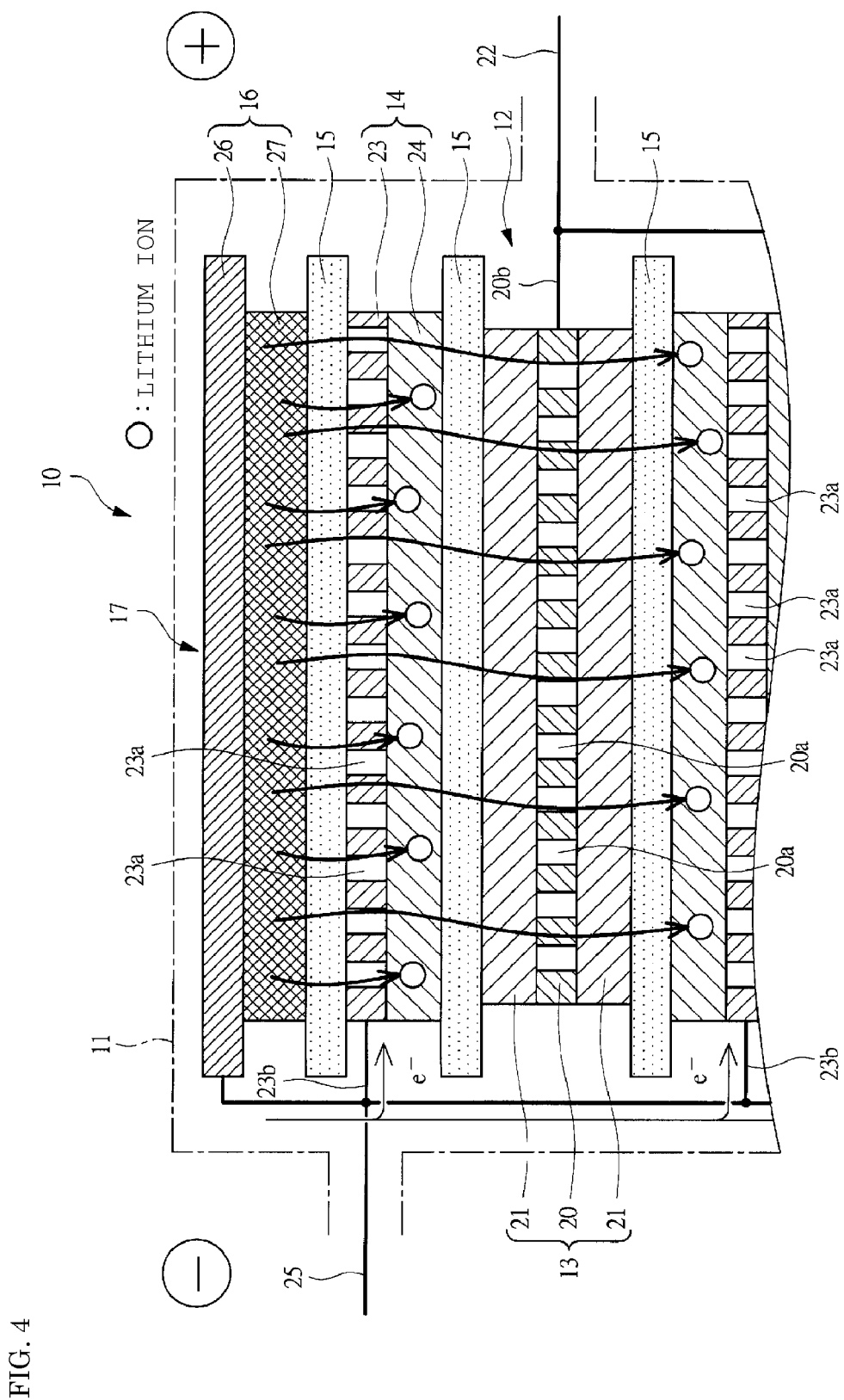
FIG. 4 is an explanatory view illustrating a pre-doping condition of lithium ions.

As described above, the lithium electrode 16 is incorporated in the electric storage device 10. The lithium electrode 16 has a lithium electrode current collector 26 that is bonded to the terminal welding part 23b of the negative electrode current collector 23. A metal lithium foil 27 serving as an ion source is press-fitted to the lithium electrode current collector 26. Thus, the negative electrode 14 and the lithium electrode 16 are electrically connected. Accordingly, when the electrolyte solution is injected into the laminate film 11, the lithium ions (ions) are doped (hereinafter referred to as "pre-dope") into the negative electrode 14 from the lithium electrode 16. FIG. 4 is an explanatory view showing the pre-doping condition of the lithium ions. Since FIG. 4 is an image view, the number of the lithium ions and other conditions are not considered in FIG. 4. As illustrated in FIG. 4, when the electrolyte solution is injected into the laminate film 11, the moving path of the lithium ions to the negative electrodes 14 from the lithium electrode 16 is formed. Thus, electrons move from the lithium electrode 16 to the negative electrodes 14 via the current collectors 23 and 26, as well as the lithium ions move from the lithium electrode 16 to the negative electrodes 14 through the electrolyte solution. As described above, the through-holes 20a and 23a through which ions pass are formed on the positive electrode current collectors 20 and the negative electrode current collectors 23. Therefore, the lithium ions emitted from the lithium electrode 16 can be moved in the laminating direction. Consequently, the lithium ions can smoothly be pre-doped into all of the laminated negative electrodes 14.

The potential of the negative electrode can be lowered by pre-doping the lithium ions into the negative electrodes 14 as described above. By virtue of this, the cell voltage of the electric storage device 10 can be enhanced. The positive electrodes 13 can deeply be discharged due to the lowering of the potential of the negative electrodes, whereby the cell capacity (discharge capacity) of the electric storage device 10 can be enhanced. The electrostatic capacitance of the negative electrodes 14 can be enhanced by pre-doping the lithium ions into the negative electrodes 14. Since the cell voltage, the cell capacity, and the electrostatic capacitance of the electric storage device 10 can be enhanced as described above, the energy density of the electric storage device 10 can be increased. From the viewpoint of increasing the capacity of the electric storage device 10, the amount of the metal lithium foil 27 is preferably set such that the potential of the positive electrode after the positive electrode 13 and the negative electrode 14 are short-circuiting becomes 2.0 V (vs. respect to $Li/Li^+$) or less.

In the above description, the lithium ions are pre-doped into the negative electrodes 14. However, the lithium ions can be pre-doped into the positive electrodes 13, or can be pre-doped into both of the positive electrodes 13 and the negative electrodes 14. The lithium ions can be pre-doped into the positive electrodes 13 by short-circuiting the positive electrode 13 and the lithium electrode 16. When the lithium ions are pre-doped into both of the positive electrodes 13 and the negative electrodes 14, the pre-doping time can be shortened. In the case where the lithium ions are pre-doped into the positive electrodes 13, the lithium ions are moved from the positive electrodes 13 to the negative electrodes 14 after the pre-doping, so that it becomes necessary to short-circuit the positive electrodes 13 and the negative electrodes 14.

As described above, the lithium ions are started to be pre-doped into the negative electrodes 14 by injecting the electrolyte solution into the laminate film 11. However, the electrolyte solution is difficult to be permeated into the electrode laminate unit, since the unit has a structure having the positive electrodes 13 and the negative electrodes 14 laminated without a gap. Therefore, during the pre-doping, the electrolyte solution is more permeated into the edge part of the electrode where the electrolyte solution is easy to be permeated, while the electrolyte solution is less permeated into the central part of the electrode where the electrolyte solution is difficult to be permeated. The variation in the amount of permeation of the electrolyte solution, which is a moving medium of the lithium ions, causes the variation in the pre-doping amount of lithium ions.

Figure 5A:
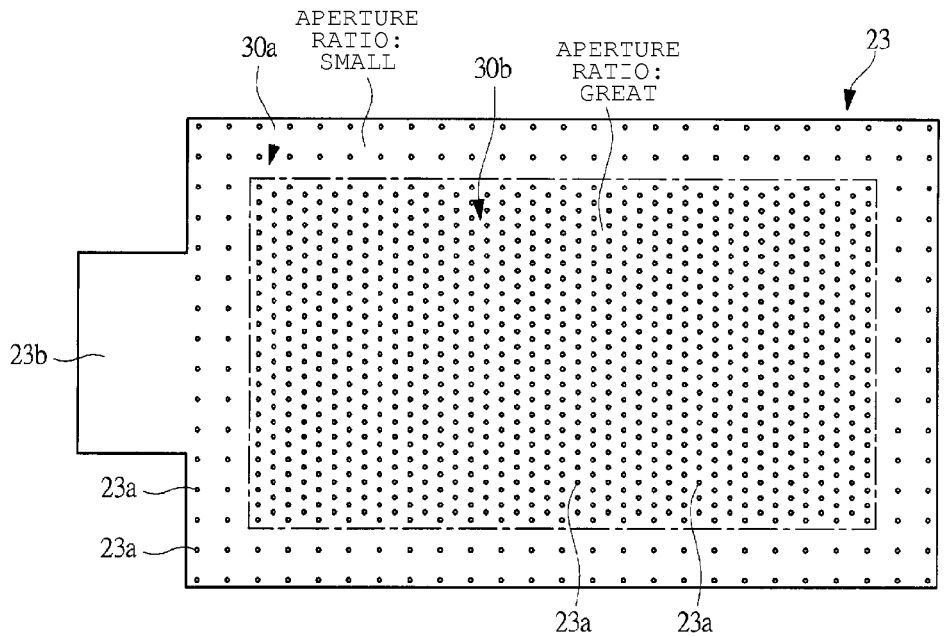
FIG. 5A is a plan view of a negative electrode current collector.
Figure 5B:
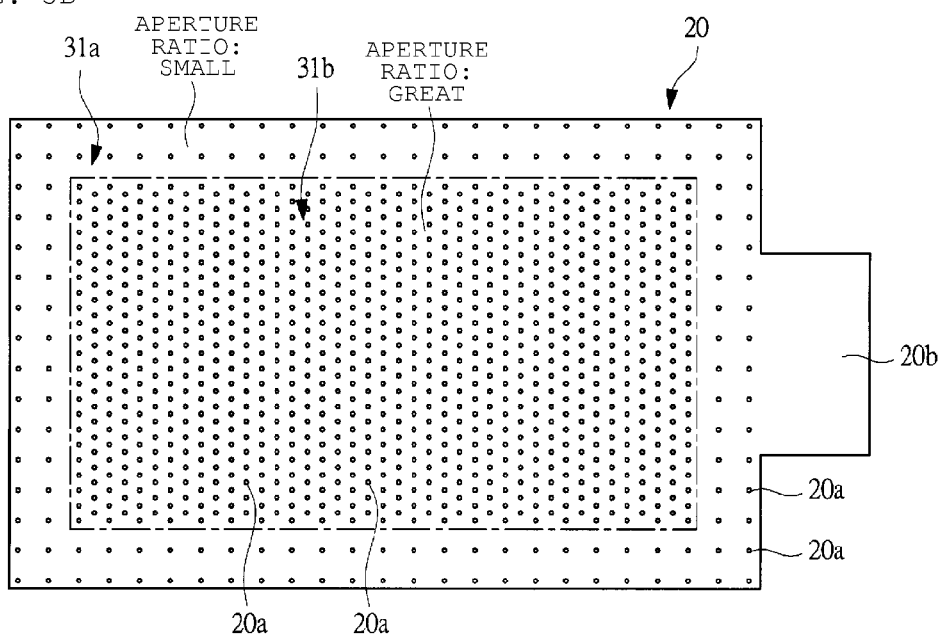
FIG. 5B is a plan view of a positive electrode current collector.

In view of this, in each of the positive electrode current collectors 20 or each of the negative electrode current collectors 23 included in the electric storage device 10 according to the present invention, the aperture ratio of the through-holes 20a and 23a (through-hole aperture ratio) at each part is changed in order to uniformly distribute the electrolyte solution. The structure of through-holes at the positive electrode current collector 20 or the negative electrode current collector 23 will be described below. FIG. 5A is a plan view of the negative electrode current collector 23. FIG. 5B is a plan view of the positive electrode current collector 20. The one-dot-chain line in FIG. 5 indicates the boundary between edge parts 30a and 31a and central parts 30b and 31b.

As shown in FIG. 5A, the space between the through-holes 23a at the edge part (first area) 30a of the negative electrode current collector 23 is formed to be greater than the space between the through-holes 23a at the central part (second area) 30b. Specifically, the aperture ratio at the edge part 30a of the negative electrode current collector 23 is smaller than the aperture ratio at the central part 30b. As shown in FIG. 5B, the space between the through-holes 20a at the edge part (first area) 31a of the positive electrode current collector 20 is formed to be greater than the space between the through-holes 20a at the central part (second area) 31b. Specifically, the aperture ratio at the edge part 31a of the positive electrode current collector 20 is smaller than the aperture ratio at the central part 31b. The through-hole aperture ratio is the ratio of a unit area of the positive electrode current collector 20 or the negative electrode current collector 23 and an open area of the through-holes 20a and 23a included in the unit area in terms of a percentage.

As described above, the aperture ratio at the edge parts 30a and 31a where the electrolyte solution is easy to be permeated is set to be small in order to suppress the permeation of the electrolyte solution. On the other hand, the aperture ratio at the central parts 30b and 31b where the electrolyte solution is difficult to be permeated is set to be greater in order to promote the permeation of the electrolyte solution. The through-hole aperture ratio is changed between the edge parts 30a and 31a and the central parts 30b and 31b in order to uniformly permeate the electrolyte solution into the edge parts 30a and 31a and the central parts 30b and 31b. Thus, the pre-doping amount of the lithium ions at each part on the surface of the negative electrode 14 can be made uniform, whereby the variation in the potential of the negative electrode on the surface thereof can be prevented. Accordingly, the local overcharge or over discharge can be avoided, whereby the deterioration of the electric storage device 10 can be prevented. Further, the local drop of the potential of the negative electrode is not caused. Therefore, the difference in the potential between the lithium electrode 16 and the negative electrode 14 can be secured, and further, the pre-doping time of the lithium ions can be shortened.

The aperture ratio of the through-holes is changed for both of the positive electrode current collector 20 and the negative electrode current collector 23 as shown in FIG. 5. However, the present invention is not limited thereto. For example, only the aperture ratio of the through-holes on the positive electrode current collector 20 can be changed, or only the aperture ratio of the through-holes on the negative electrode current collector 23 can be changed. The electric storage device 10 includes plural negative electrode current collectors 23 and the positive electrode current collectors 20. The aperture ratio of the through-holes on some negative electrode current collectors 23 or some positive electrode current collectors 20 can be changed. In the case illustrated in FIG. 5, the electrode surface is divided into the edge parts 30a and 31a and the central parts 30b and 31b, wherein the aperture ratio of the through-holes are changed in two levels. However, the present invention is not limited thereto. For example, the electrode surface is divided into three or more areas, and the aperture ratio can be changed in multi-levels. Alternatively, the aperture ratio can continuously be changed from the edge of the electrode surface toward the center.

In the above description, the aperture ratio of the through-holes at each part is changed from the viewpoint of the uniform distribution of the electrolyte solution. However, the aperture ratio of the through-holes at each part can be changed from the viewpoint of a current density of the negative electrode current collector 23 during the pre-doping. During the pre-doping, the electrons move from the lithium electrode 16 to the negative electrode 14 in accordance with the potential difference between the lithium electrode 16 and the negative electrode 14. The lithium ions move from the lithium electrode 16 to the negative electrode 14 so as to balance with the moving electrons. The small electric current flowing between the lithium electrode 16 and the negative electrode 14 during the pre-doping affects the pre-doping amount of the lithium ions as described above. However, the current density tends to increase at the part closer to the terminal welding part 23b of the negative electrode 14, since this part is close to the lithium electrode 16 and has low electric resistance. On the other hand, the current density tends to decrease at the part apart from the terminal welding part 23b, since this part is remote from the lithium electrode 16 and has high electric resistance. The variation in the current density that affects the attraction force of the lithium ions causes the variation in the pre-doping amount of the lithium ions.

Figure 6:
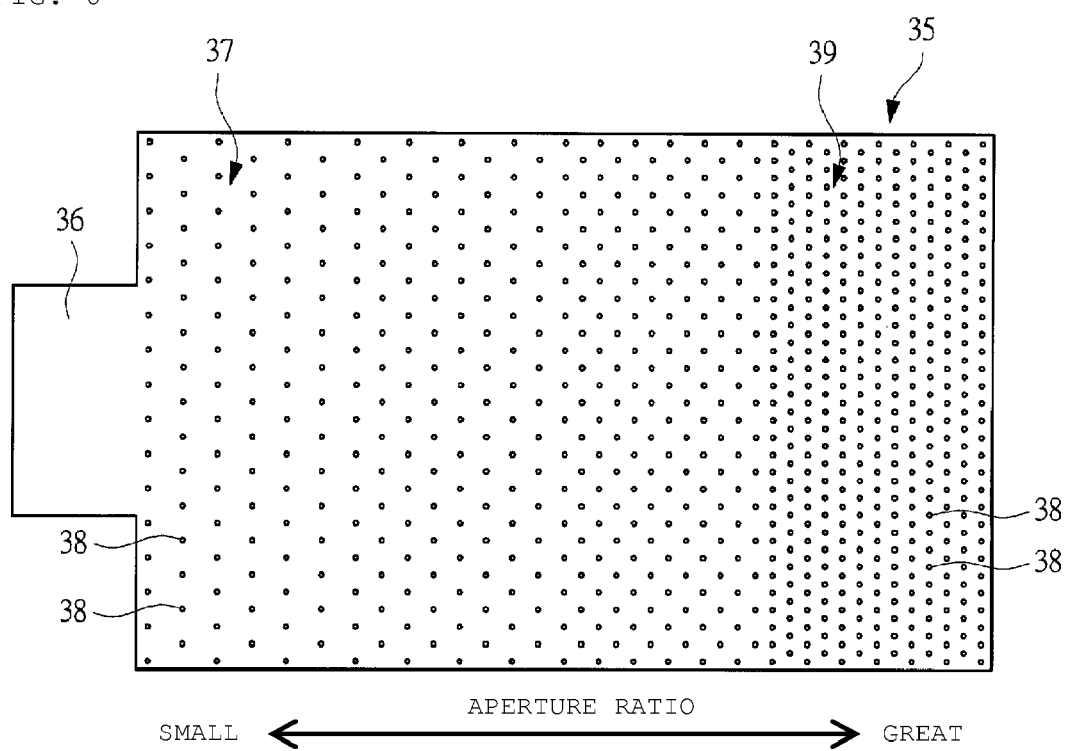
FIG. 6 is a plan view of a negative electrode current collector included in an electric storage device according to another embodiment of the present invention.

In view of this, in a negative electrode current collector 35 included in an electric storage device according to another embodiment of the present invention, the aperture ratio of the through-holes at each part is changed from the viewpoint of the current density. FIG. 6 is a plan view of the negative electrode current collector 35 included in an electric storage device according to another embodiment of the present invention. Since the overall structure of the electric storage device according to another embodiment of the present invention is the same as the overall structure shown in FIGS. 1 to 3, only the structure of the through-hole on the negative electrode current collector 35 will be described.

As shown in FIG. 6, the space of through-holes 38 at the part (first area) 37 close to the terminal welding part (connection part) 36 of the negative electrode current collector 35 is formed to be greater than the space of the through-holes 38 at the part (second area) 39 apart from the terminal welding part 36. Specifically, the aperture ratio (through-hole aperture ratio) of the through-holes 38 at the part 37 close to the terminal welding part 36 is smaller than the through-hole aperture ratio at the part 39 apart from the terminal welding part 36. Since the ions are easy to be pre-doped due to the high current density at the part 37 close to the terminal welding part 36 of the negative electrode current collector 23, the through-hole aperture ratio is set smaller so as to suppress the permeation of the electrolyte solution. On the other hand, since the ions are difficult to be pre-doped due to the low current density at the part 39 apart from the terminal welding part 36 of the negative electrode current collector 23, the through-hole aperture ratio is set greater so as to promote the permeation of the electrolyte solution. With this structure, the pre-doping amount of the lithium ions at each part on the electrode surface of the negative electrode 14 can be made uniform, whereby the variation in the potential of the negative electrode on its electrode surface can be prevented. Accordingly, the deterioration of the electric storage device can be prevented, and further, the pre-doping time of the lithium ions can be shortened.

Even in case where the lithium ions are pre-doped into the positive electrode 13 by connecting the positive electrode 13 and the lithium electrode 16, the through-holes are formed on the positive electrode current collector with the aperture ratio being changed like the case of the negative electrode current collector 35. Specifically, since the ions are easy to be pre-doped due to the high current density at the part close to the terminal welding part of the positive electrode current collector, the through-hole aperture ratio is set smaller so as to suppress the permeation of the electrolyte solution. On the other hand, since the ions are difficult to be pre-doped due to the low current density at the part apart from the terminal welding part of the positive electrode current collector, the through-hole aperture ratio is set greater so as to promote the permeation of the electrolyte solution. In the case shown in FIG. 6, the aperture ratio is changed at multi-levels from the part 37 close to the terminal welding part 36 toward the part 39 apart therefrom. However, the aperture ratio can continuously be changed from the part 37 close to the terminal welding part 36 toward the part 39. The electric storage device includes plural negative electrode current collectors 35 and positive electrode current collectors incorporated therein. The aperture ratio of the through-holes can be changed for some negative electrode current collectors 35 or some positive electrode current collectors.

Figure 7A:
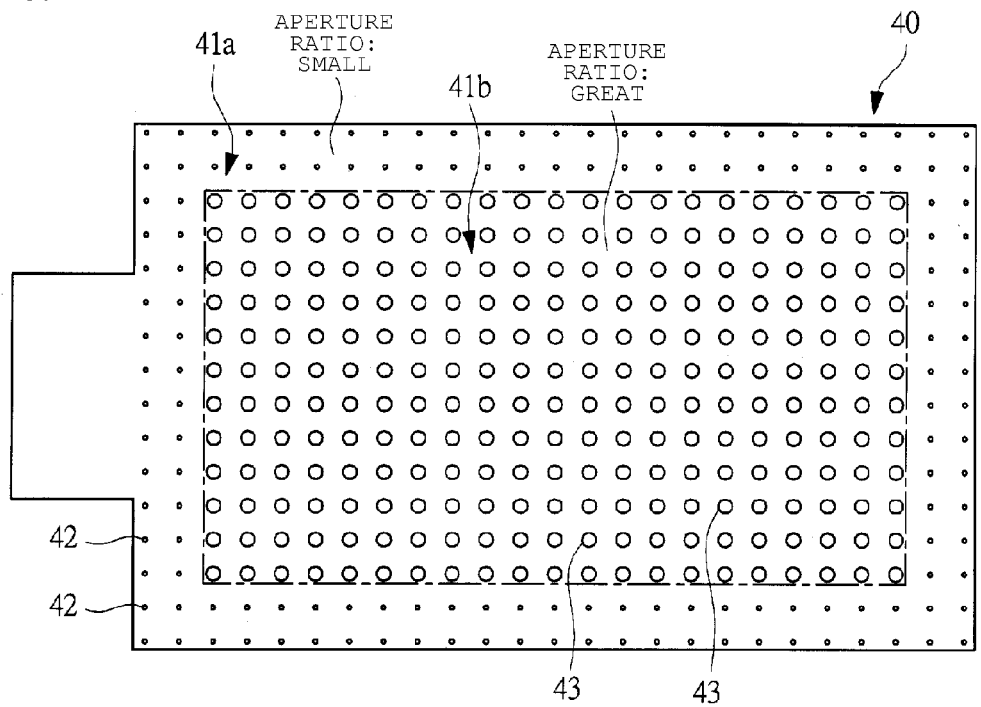
FIGS. 7A and 7B are plan views of a negative electrode current collector included in an electric storage device according to another embodiment of the present invention.
Figure 7B:
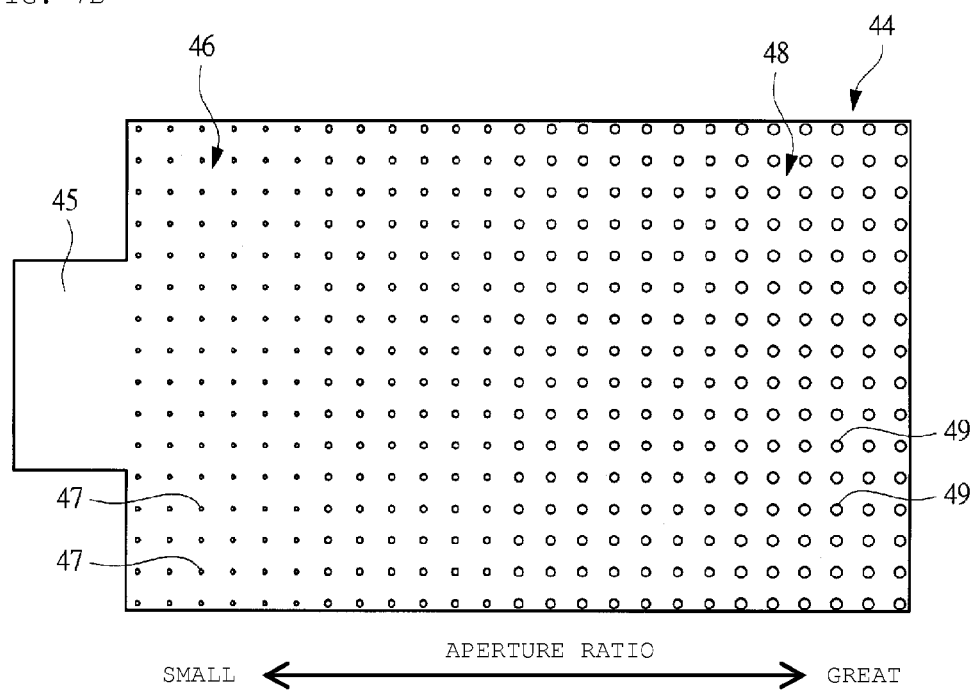

In the above description, the space between the adjacent through-holes 20a and 23a is changed in order to change the aperture ratio of the through-holes. However, the present invention is not limited thereto. The size of the through-hole can be changed. FIG. 7A is a plan view showing a negative electrode current collector (electrode current collector) 40 included in an electric storage device according to another embodiment of the present invention. FIG. 7B is a plan view of a negative electrode current collector (electrode current collector) 44 included in an electric storage device according to another embodiment of the present invention. The one-dot-chain line in FIG. 7A indicates the boundary between an edge part 41a and a central part 41b.

As shown in FIG. 7A, through-holes 42 each having a small diameter are formed at an edge part (first area) 41a of the negative electrode current collector 40. On the other hand, through-holes 43 each having a great diameter are formed at a central part (second area) 41b of the negative electrode current collector 40. When the size of each of the through-holes 42 at the edge part 41a and the size of each of the through-holes 43 at the central part 41b are made different from each other, the electrolyte solution can uniformly be distributed, whereby the pre-doping amount can be made uniform. As shown in FIG. 7B, through-holes 47 each having a small diameter are formed at a part (first area) 46 close to a terminal welding part (connection part) 45 of a negative electrode current collector 44. Through-holes 49 each having a great diameter are formed at a part (second area) 48 apart from the terminal welding part 45 of the negative electrode current collector 44. When the size of each of the through-holes 47 at the part 46 close to the terminal welding part 45 and the size of each of the through-holes 49 at the part 48 apart from the terminal welding part 45 are made different from each other, the pre-doping amount can be made uniform.

Figure 8A:
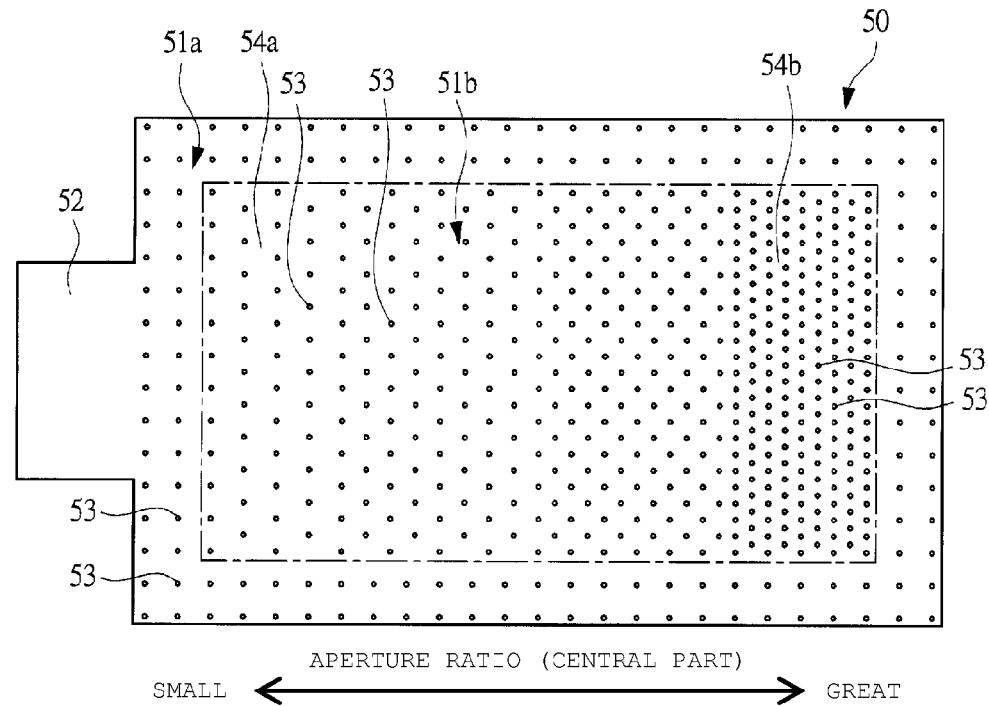
FIGS. 8A and 8B are plan views of a negative electrode current collector included in an electric storage device according to another embodiment of the present invention.
Figure 8B:
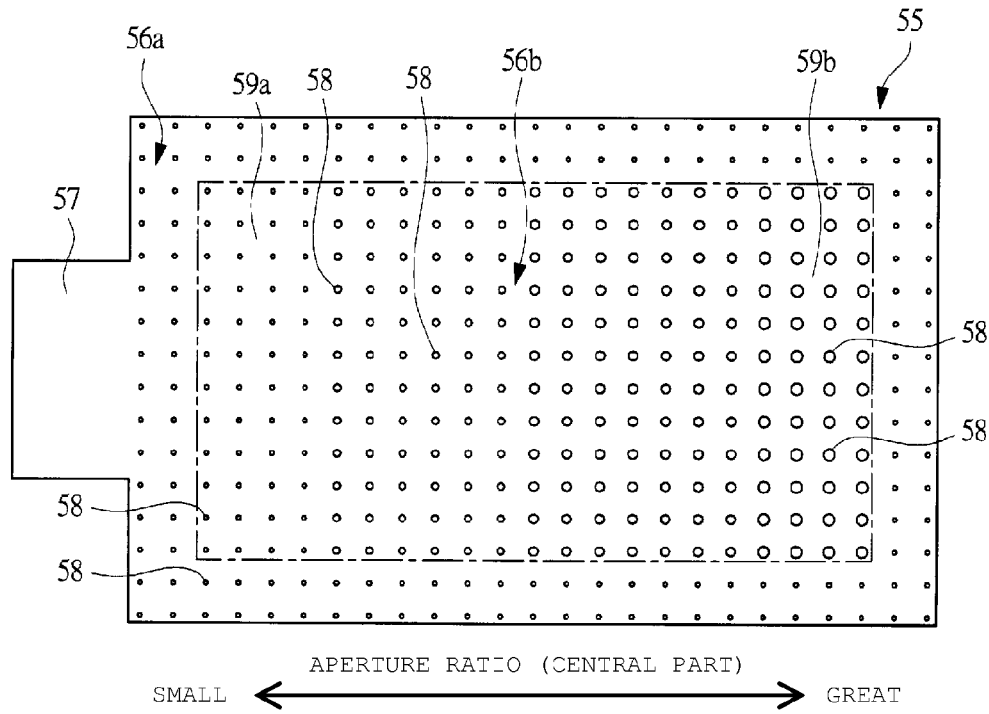

In the above description, the aperture ratio of the through-holes is changed from the viewpoint of the distribution of the electrolyte solution or the current density. However, the present invention is not limited thereto. The aperture ratio of the through-holes can be changed from the viewpoint of both of the distribution of the electrolyte solution and the current density. FIG. 8A is a plan view showing a negative electrode current collector (electrode current collector) 50 included in an electric storage device according to still another embodiment of the present invention. FIG. 8B is a plan view showing a negative electrode current collector (electrode current collector) 55 included in an electric storage device according to still another embodiment of the present invention. The one-dot-chain line in FIG. 8A indicates the boundary between edge parts 51a and 56a and central parts 51b and 56b.

As shown in FIGS. 8A and 8B, the aperture ratio (through-hole aperture ratio) of the through-holes 53 and 58 at the edge parts (first area) 51a and 56a where the electrolyte solution is easy to be permeated is set to be small so as to suppress the permeation of the electrolyte solution. On the other hand, the aperture ratio of the through-holes at the central parts (second area) 51b and 56b where the electrolyte solution is difficult to be permeated is set to be great so as to promote the permeation of the electrolyte solution. At the central parts 51b and 56b of the negative electrode current collectors 50 and 55, the aperture ratio of the through-holes is set to be greater at the part apart from the terminal welding parts (connection parts) 52 and 57. Specifically, since the ions are easy to be pre-doped due to the high current density at the parts (first areas) 54a and 59a close to the terminal welding parts 52 and 57, the through-hole aperture ratio is set smaller so as to suppress the permeation of the electrolyte solution. On the other hand, since the ions are difficult to be pre-doped due to the low current density at the parts (second areas) 54b and 59b apart from the terminal welding parts 52 and 57, the through-hole aperture ratio is set greater so as to promote the permeation of the electrolyte solution. When the aperture ratio of the through-holes at each part is set considering both of the distribution of the electrolyte solution and the current density as described above, the pre-doping amount can be made more uniform.

Figure 9:
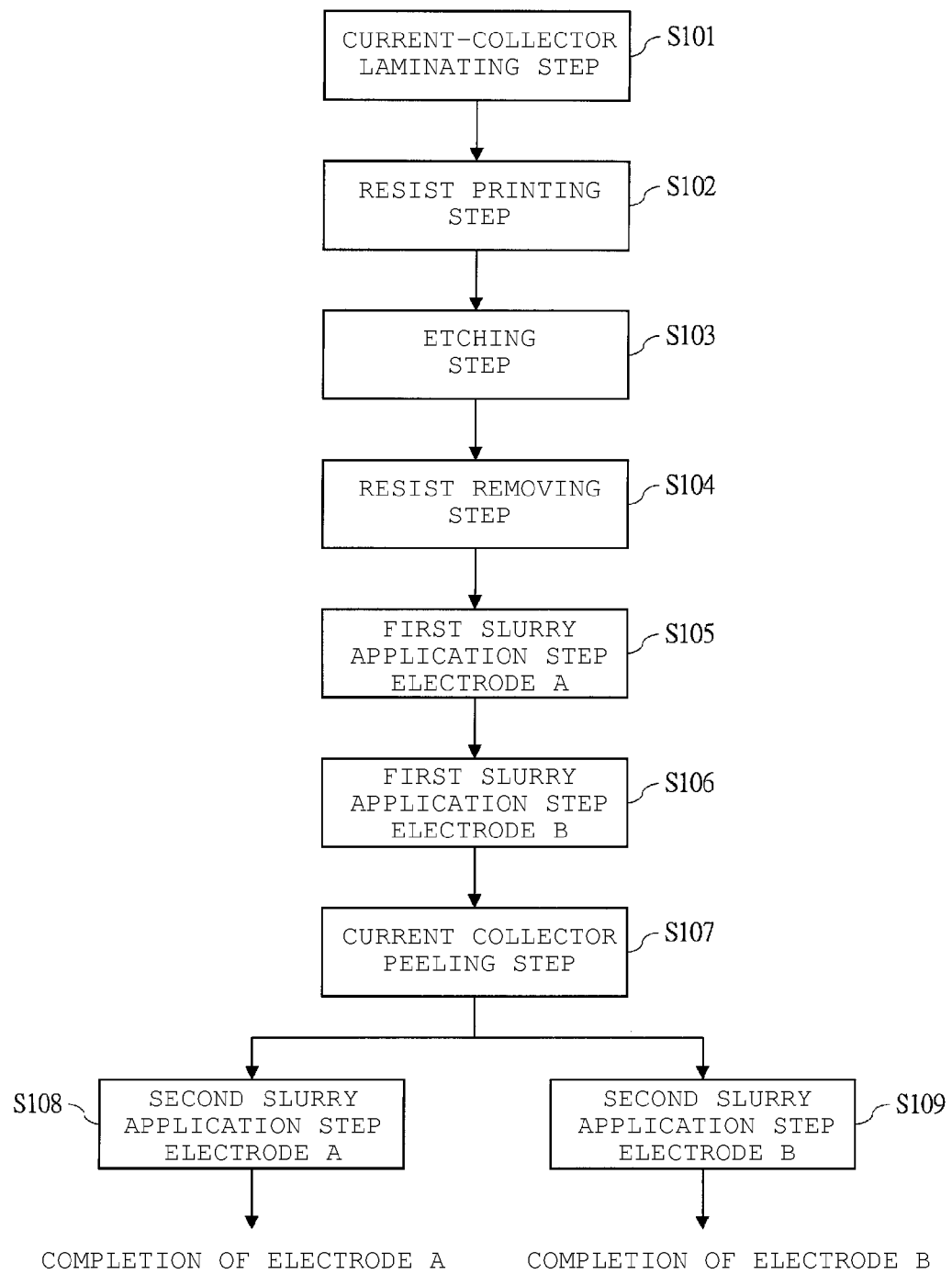
FIG. 9 is a flowchart showing a production method of an electrode.

Subsequently, a production process of the positive electrode 13 and the negative electrode 14 having the through-holes 20a and 23a will be explained. In the description of the production process, the positive electrode 13 and the negative electrode 14 are described collectively as an electrode in order to explain the production process of the positive electrode 13 and the negative electrode 14 at one time. In the description of the production process below, the positive electrode mixture layer 21 and the negative electrode mixture layer 24 are described as an electrode mixture layer. FIG. 9 is a flowchart showing a production process of an electrode. FIGS. 10 and 11 are schematic views showing an electrode state during each of the production steps. The electrodes having the through-holes 38, 42, 43, 47, 49, 53, and 58 can also be produced according to the same production method.

Figure 10A:
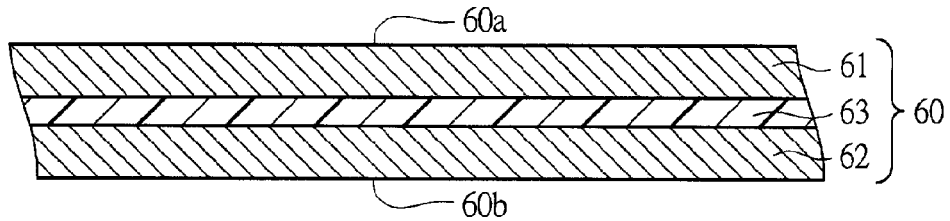
FIGS. 10A to 10D are schematic views, each showing an electrode state during each production process.

As shown in FIG. 9, a current collector laminating step for forming a current-collector laminate unit 60 is executed at step S101. In the current collector laminating step, a long-sized current-collector materials 61 and 62 made of a metal foil are prepared, and a long-sized film material 63 is prepared as a support member as shown in FIG. 10A. The film material 63 is sandwiched between a pair of the current-collector materials 61 and 62 so as to form the current-collector laminate unit 60 made of the current-collector materials 61 and 62 and the film material 63. When the positive electrodes 13 are manufactured, an aluminum foil is used as the current-collector materials 61 and 62, for example. On the other hand, when the negative electrodes 14 are manufactured, a copper foil is used as the current-collector materials 61 and 62, for example. The material having resistance to later-described etching solution is used for the film material 63. It is preferable that a slightly adhesive film or peelable film is used for the film material 63 in order to cope with a later-described current-collector peeling step. For example, REVALPHA (registered trademark, made by Nitto Denko) can be used as a film that can be peeled through the application of heat. PANAPROTECT (registered trademark, made by Panac) can be used as a slightly adhesive film.

Figure 10B:
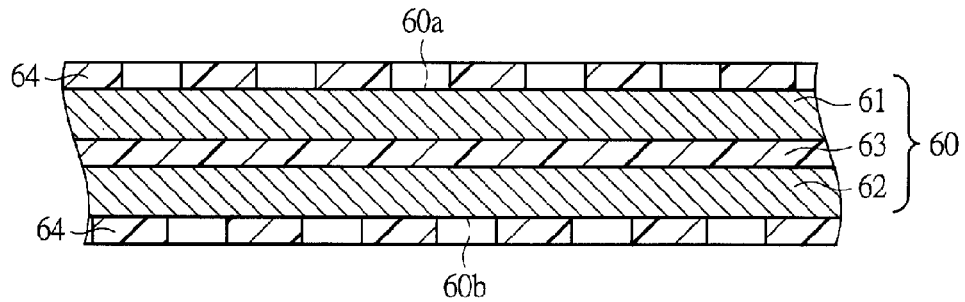
Figure 10C:
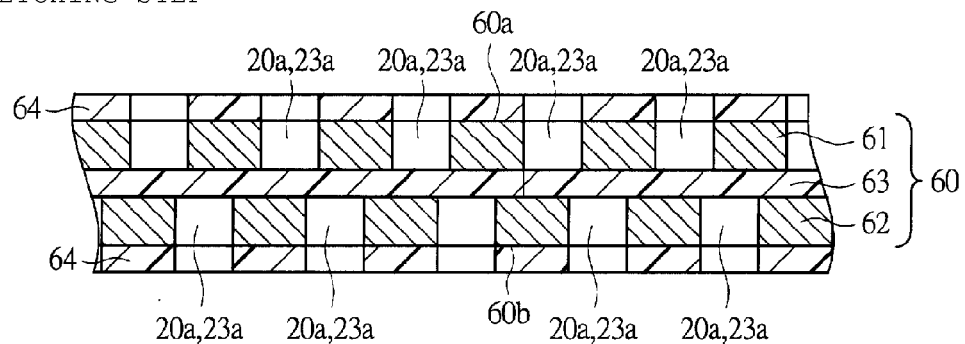

As shown in FIG. 9, a resist printing step for forming resist layers 64 on the current-collector laminate unit 60 is executed at the next step S102. In the resist printing step, resist ink is printed on both of one surface 60a and the other surface 60b of the current-collector laminate unit 60 with a predetermined pattern as shown in FIG. 10B. Thus, the resist layers 64 having the predetermined pattern are formed on both of the one surface 60a and the other surface 60b of the current-collector laminate unit 60. In the resist printing step, the resist ink is printed by gravure printing or screen printing. When the film material 63 is present, it is unnecessary to match both patterns. Ordinary ink can be used as the resist ink, so long as it has resistance to the etching solution. The ink that can be dissolved and removed by alkali solvent is preferably used as the resist ink.

In the above-mentioned description, the resist layer 64 is formed by using liquid resist ink. However, a dry film resist, which is formed into a film beforehand, can be applied. For example, FXR or FX900 made by DuPont MRC Dryfilm Ltd. can be used as the dry film resist. When the dry film resist is used, the applied dry film resist is subject to an exposure process and developing process so as to form the resist layer 64 having the predetermined pattern on the current-collector laminate unit 60.

As shown in FIG. 9, an etching step for forming the through-holes 20a and 23a to the current-collector laminate unit 60 is executed at the next step S103. In the etching step, the etching process is performed to the current-collector laminate unit 60 with the resist layers 64 used as a mask as shown in 10C. Thus, a large number of through-holes 20a and 23a are formed on the current-collector materials 61 and 62 from both of the one surface 60a and the other surface 60b of the current-collector laminate unit 60. The etching solution used for the etching process is appropriately selected according to the type of the current-collector materials 61 and 62. When the aluminum foil or copper foil is used as the current-collector materials 61 and 62, aqueous solution of ferric chloride, sodium hydroxide, or hydrochloric acid can be used as the etching solution.

Figure 10D:
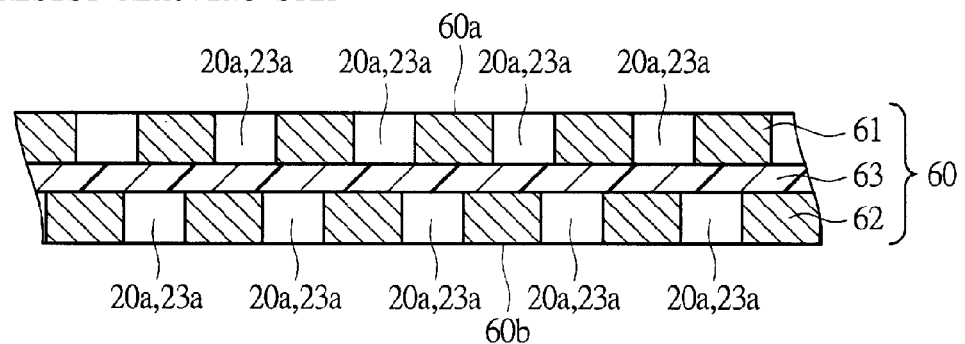

As shown in FIG. 9, at the next step S104, a resist removing step for removing the resist layers 64 from the current-collector laminate unit 60 is executed. In the resist removing step, the resist layers 64, which protect the non-etched section other than the through-holes 20a and 23a, are removed from the current-collector laminate unit 60 as shown in FIG. 10D. When the resist ink that can be dissolved into alkali solvent is used, the etching process is performed by means of hydrochloric acid or the like, cleaning is performed, and then, the resist layers can be removed by using aqueous solution of sodium hydroxide. The current-collector laminate unit 60 is washed, neutralized, and washed, repeatedly, to dry the current-collector laminate unit 60, whereby the current-collector materials 61 and 62 having the through-holes 20a and 23a formed thereon are formed with the film material 63 sandwiched therebetween.

Since the etching process is simultaneously performed to the plural current-collector materials 61 and 62 as described above, the production cost of the positive electrode current collector 20 provided with the through-holes 20a or the negative electrode current collector 23 provided with the through-holes 23a can remarkably be lowered. The film material 63 that can block the etching solution is interposed between the current-collector materials 61 and 62, whereby the etching process is performed to the respective current-collector materials 61 and 62 from one surface. Therefore, it is unnecessary to match the patterns on the resist layers 64 formed on both surfaces of the current-collector laminate unit 60, with the result that the production cost of the positive electrode current collector 20 or the negative electrode current collector 23 can be lowered.

Figure 11A:
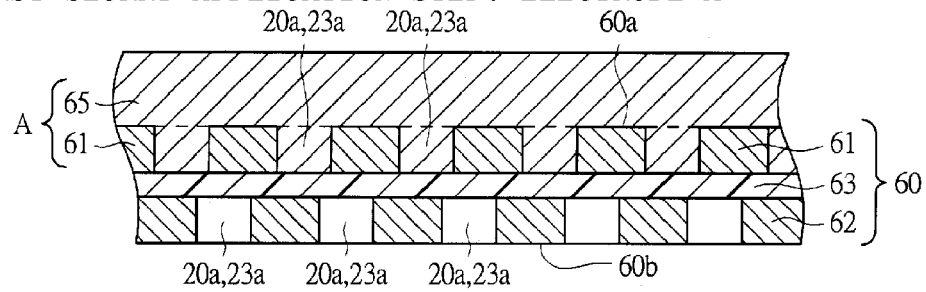
FIGS. 11A to 11D are schematic views, each showing an electrode state during each production process.
Figure 12:
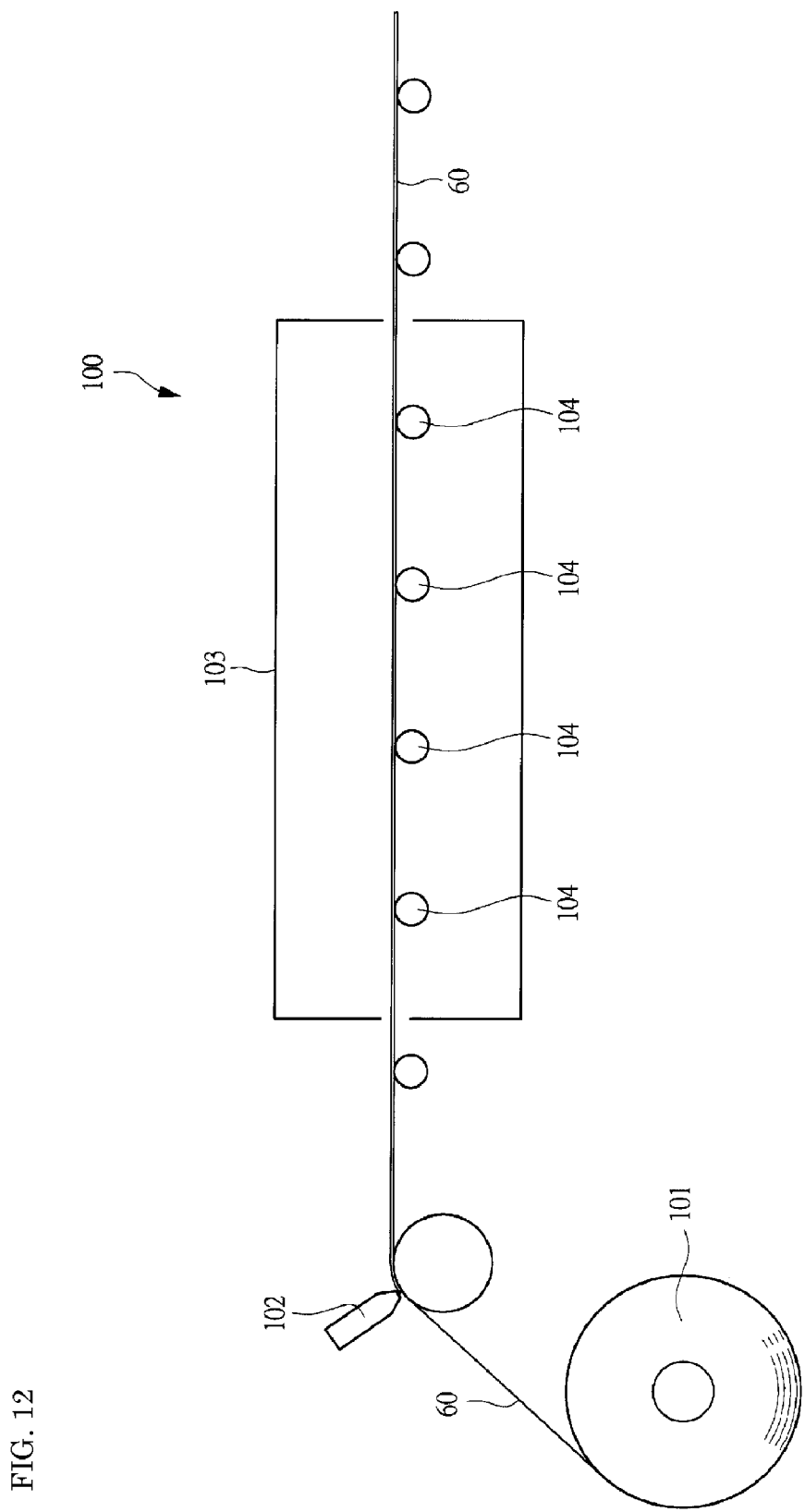
FIG. 12 is a schematic view showing one example of a coating/drying machine.

Then, as shown in FIG. 9, a first slurry application step for forming a first electrode mixture layer 65 on an electrode A, which is constituted by the current-collector material 61, is executed at step S105. In the first slurry application step, an electrode slurry is applied onto the one surface 60a of the current-collector laminate unit 60 as shown in FIG. 11A. The electrode mixture layer 65 is formed on the front surface of the current-collector laminate unit 60 by drying the electrode slurry. FIG. 12 is a schematic view showing one example of a coating/drying device 100. As shown in FIG. 12, the current-collector laminate unit 60 that has been subject to the etching process and drawn from a roll 101 is guided to an application section 102 such as a die coater or the like. The electrode slurry is applied onto the current-collector laminate unit 60 at the application section 102. In order to dry the applied electrode slurry, the current-collector laminate unit 60 passes through a drying furnace 103 as being conveyed in the horizontal direction.

As described above, the film material 63 is provided between the current-collector materials 61 and 62. Therefore, even when the electrode slurry is applied onto the current-collector materials 61 and 62 formed with the through-holes 20a and 23a, there is no chance that the electrode slurry passes through the through-holes 20a and 23a to reach the backside of the current-collector laminate unit 60. Accordingly, the electrode slurry is not deposited onto guide rollers 104 or the like, whereby the current-collector laminate unit 60 can be conveyed in the horizontal direction. Thus, the drying furnace 103 can be set longer compared to the application method in which the current-collector material is lifted up in the vertical direction. Consequently, the conveying speed of the current-collector materials 61 and 62 can be increased, whereby the productivity of the electrode can be enhanced. The current-collector materials 61 and 62 having the through-holes 20a and 23a have strength lower than the strength of a current-collector material having no through-holes. Therefore, it has been difficult to increase the conveying speed of the current-collector materials 61 and 62 having the through-holes 20a and 23a. On the other hand, the strength of the current-collector materials 61 and 62 can be increased by superimposing the current-collector materials 61 and 62 with the film material 63 sandwiched therebetween. Accordingly, the conveying speed of the current-collector materials 61 and 62 can be increased, whereby the productivity of the electrode can be enhanced.

Figure 11B:
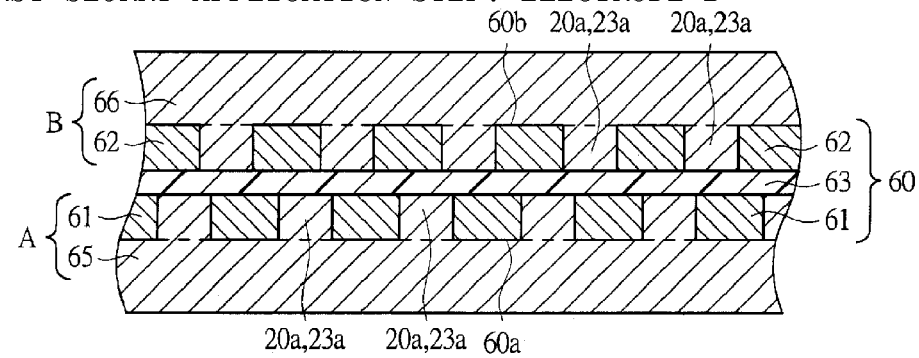

As shown in FIG. 9, a first slurry application step for forming a first electrode mixture layer 66 on the electrode B that is constituted by the other current-collector material 62 is then executed at the next step S106. In the first slurry application step, an electrode slurry is applied onto the other surface 60b of the current-collector laminate unit 60 that is vertically inverted, as shown in FIG. 11B. The electrode mixture layer 66 is formed on the front surface 60b of the current-collector laminate unit 60 by drying the electrode slurry. The film material 63 is formed on one surface of the current-collector material 61, while the electrode mixture layer 65 is formed on the other surface of the current-collector material 61. Further, the film material 63 is formed on one surface of the current-collector material 62, while the electrode mixture layer 66 is formed on the other surface of the current-collector material 62. In the first slurry application step, the current-collector laminate unit 60 includes the film material 63 and the electrode mixture layer 65, so that there is no chance that the electrode slurry passes through the through-holes 20a and 23a to reach the backside of the current-collector laminate unit 60. Accordingly, the electrode mixture layer 66 can efficiently be formed while conveying the current-collector laminate unit 60 in the horizontal direction.

Figure 11C:
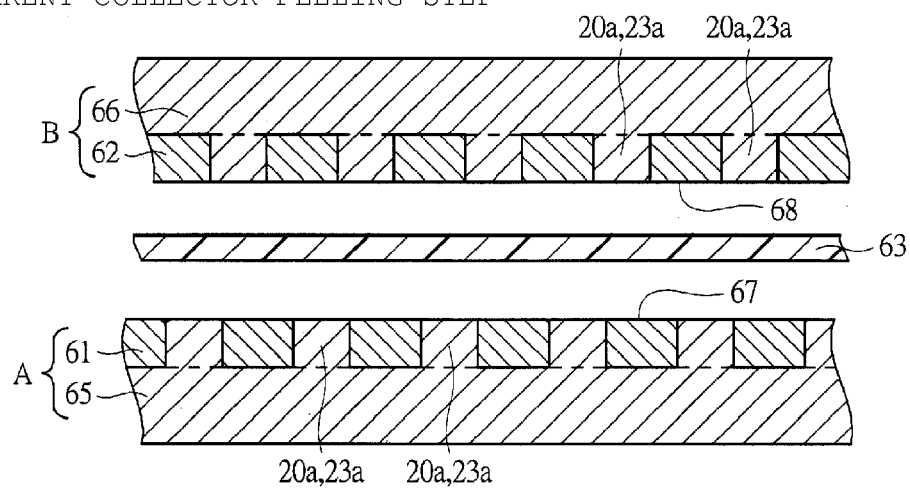

As shown in FIG. 9, at the next step S107, a current collector peeling step for peeling the current-collector materials 61 and 62 from the current-collector laminate unit 60 is executed. As shown in FIG. 11C, the current-collector materials 61 and 62 provided with the electrode mixture layers 65 and 66 are peeled from the film material 63 in the current collector peeling step. When a heat-peelable film is used as the film material 63, the current-collector materials 61 and 62 can easily be peeled, since the adhesion force of the heat-peelable film is lowered during when the current-collector laminate unit 60 passes through the drying furnace 103.

Figure 11D:
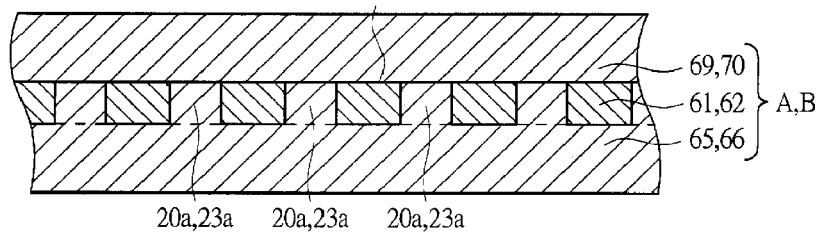

As shown in FIG. 9, a second slurry application step for forming a second electrode mixture layer 69 on a non-applied surface 67 of the peeled current-collector material 61 is executed at the next step S108. Similarly, at step S109, the second slurry application step for forming a second electrode mixture layer 70 on a non-applied surface 68 of the peeled current-collector material 62 is executed. In the second slurry application steps, the electrode slurry is applied on the non-applied surfaces 67 and 68 of the current-collector materials 61 and 62 with the electrode mixture layers 65 and 66 arranged downward as shown in FIG. 11D. The electrode slurry is dried so as to form the electrode mixture layers 69 and 70 on the non-applied surfaces 67 and 68 of the current-collector materials 61 and 62. In the second slurry application step, the electrode mixture layers 65 and 66 are provided on the current-collector materials 61 and 62. Therefore, there is no chance that the electrode slurry passes through the through-holes 20a and 23a to reach the backside of the current-collector materials 61 and 62. Accordingly, the electrode mixture layers 69 and 70 can efficiently be formed while conveying the current-collector materials 61 and 62 in the horizontal direction.

As described above, the film material 63 serving as the support member is attached on one surface of the current-collector materials 61 and 62, and with this state, the through-holes 20a and 23a are formed from the other surface of the current-collector materials 61 and 61. Thereafter, the electrode slurry is applied from the other surface of the current-collector materials 61 and 62 so as to form the electrode mixture layers 65 and 66. Since the film material 63 is provided, the strength of the current-collector materials 61 and 62, having the through-holes 20a and 23a formed thereon, can be increased, whereby the current-collector materials 61 and 62 during the production are easy to handle. Since the film material 63 is provided, it is possible to prevent the applied electrode slurry from passing through the through-holes 20a and 23a to reach the backside of the current-collector materials 61 and 62. Accordingly, the electrode slurry can be applied while conveying the current-collector materials 61 and 62 in the horizontal direction, whereby the productivity of the electrode can be enhanced, and the production cost can be lowered.

Although the film material 63 serving as the support member is provided, a resist layer serving as the support member can be formed between the current-collector materials 61 and 62 by applying resist ink between the current-collector materials 61 and 62. In the flowchart shown in FIG. 9, two current-collector materials 61 and 62 are superimposed to form two current collectors at one time. However, the present invention is not limited thereto. For example, the film material 63 can be attached on one surface of a single current-collector material 61, the through-holes 20a and 23a can be formed from the other surface of the current-collector material 61, and then, the electrode mixture layer 65 can be formed.

The components of the aforesaid electric storage device will be explained in detail in the order described below: [A] positive electrode, [B] negative electrode, [C] negative electrode current collector and positive electrode current collector, [D] lithium electrode, [E] separator, [F] electrolyte solution, [G] outer casing.

[A] Positive Electrode

The positive electrode has the positive-electrode current collector and the positive electrode mixture layer coated on the positive electrode current collector. When the electric storage device works as a lithium ion capacitor, a material that allows lithium ions and/or anions to be reversibly doped and de-doped can be employed as a positive electrode active material contained in the positive electrode mixture layer. Specifically, the positive electrode active material is not particularly limited, so long as it allows at least one of lithium ion and anion to be reversibly doped and de-doped. Examples of the positive-electrode active materials include activated carbon, transition metal oxide, conductive polymer, polyacene-based substance, etc.

For example, the activated carbon is made of an activated carbon grain that is subject to an alkali activation treatment and has a specific surface area of not less than 600 m$^2$/g. A phenolic resin, petroleum pitch, petroleum coke, coconut husk, coal-derived coke, etc. are used as the material of the activated carbon, wherein it is preferable to use the phenolic resin or coal-derived coke, since they can increase the specific surface area. Preferable alkali activators used for the alkali activation treatment of the activated carbons include salts or hydroxides of a metal ion such as lithium, sodium, potassium, etc., wherein potassium hydroxide is more preferable. Examples of the methods of the alkali activation include the method in which a carbide and an activator are mixed, and then, the resultant is heated in an airflow of inert gas, the method in which an activator is carried on a raw material of an activated carbon beforehand, the resultant is heated, and then, a carbonizing process and activating process are performed, the method in which a carbide is activated with a gas activation by using water vapors, and then, the resultant is surface-treated with an alkali activator. The activated carbon to which the alkali activation treatment is performed is pulverized by means of a known pulverizer such as a ball mill or the like. The grain size generally used within a wide range can be applied. For example, it is preferable that $D_{50}$ is 2 μm or more, more preferably 2 to 50 μm, and most preferably 2 to 20 μm. Further, the activated carbon preferably having an average pore diameter of 10 nm or less and a specific surface area of 600 to 3000 m$^2$/g is preferable. An activated carbon having a specific surface area of 800 m$^2$/g or more, particularly 1300 to 2500 m$^2$/g is more preferable.

When the electric storage device works as a lithium ion battery, a conductive polymer such as polyanine or a material that allows lithium ions to be reversibly doped or de-doped can be employed as the positive electrode active material contained in the positive electrode mixture layer. For example, vanadium oxide ($V_2O_5$) or lithium cobalt oxide ($LiCoO_2$) can be used as the positive electrode active material. Examples of the other materials include a lithium-containing metal oxide represented by a chemical formula of $Li_xM_yO_z$ (x, y, z are positive numbers, M is a metal, or can be metals of two or more types), such as $Li_xCoO_2$, $Li_xNiO_2$, $Li_xMnO_2$, $Li_xFeO_2$, etc., or a transition metal oxide such as cobalt, manganese, vanadium, titanium, nickel, etc, or a sulfide. In case of requiring a high voltage, a lithium-containing oxide having a potential of 4 V or more with respect to the metal lithium is preferably used. More preferable lithium-containing oxides include a lithium-containing cobalt oxide, lithium-containing nickel oxide, or lithium-containing cobalt-nickel compound oxide.

The positive electrode active material such as an activated carbon described above is formed into a powdery shape, granular shape, short fibrous shape, etc., and this positive electrode active material is mixed with a binder to form an electrode slurry. The electrode slurry containing the positive electrode active material is coated on the positive electrode current collector and the resultant is dried, whereby the positive electrode mixture layer is formed on the positive electrode current collector. Usable binders mixed with the positive electrode active material include rubber binder such as SBR, fluorine-containing resin such as polytetrafluoroethylene, polyvinylidene fluoride, etc., thermoplastic resin such as polypropylene, polyethylene, polyacrylate, etc. A conductive material such as acetylene black, graphite, metal powder, etc. can appropriately be added to the positive electrode mixture layer.

[B] Negative Electrode

The negative electrode has the negative electrode current collector and the negative electrode mixture layer coated on the negative electrode current collector. The negative electrode mixture layer contains a negative electrode active material. The negative electrode active material is not particularly limited, so long as it allows lithium ions to be reversibly doped and de-doped. Examples of the negative-electrode active material include graphite, various carbon materials, polyacene-based material, tin oxide, silicon oxide, etc. The graphite and hard carbon material (non-graphitizable carbon) are preferable as the negative-electrode active material, since they can increase the capacity. Further, a polyacene-based organic semiconductor (PAS) that is a heat-treated material of an aromatic condensation polymer is preferable for a negative-electrode active material, since it can increase the capacity. The PAS has a polyacene skeletal structure. The ratio (H/C) of a number of hydrogen atoms to a number of carbon atoms is preferably within the range of not less than 0.05 and not more than 0.50. When the H/C of the PAS exceeds 0.50, the aromatic polycyclic structure is not sufficiently grown, so that the lithium ions cannot smoothly be doped or de-doped. Therefore, the charging/discharging efficiency of the electric storage device might be lowered. When the H/C of the PAS is less than 0.05, the capacity of the electric storage device might be lowered.

The aforesaid negative-electrode active material such as PAS is formed into a powdery shape, a granular shape or short fibrous shape. This negative electrode active material is mixed with a binder to form an electrode slurry. The electrode slurry containing the negative electrode active material is coated on the negative electrode current collector and the resultant is dried, whereby the negative electrode mixture layer is formed on the negative electrode current collector. Usable binders mixed with the negative electrode active material include fluorine-containing resin such as polytetrafluoroethylene, polyvinylidene fluoride, etc., thermoplastic resin such as polypropylene, polyethylene, polyacrylate, etc, and a rubber binder such as styrene butadiene rubber (SBR), etc. The fluorine-based binder is preferably used. Examples of the fluorine-based binder include polyvinylidene fluoride, copolymer of vinylidene fluoride and trifluoroethylene, copolymer of ethylene and tetrafluoroethylene, copolymer of propylene and tetrafluoroethylene, etc. A conductive material such as acetylene black, graphite, metal powder, etc. can appropriately be added to the negative-electrode mixture layer.

[C] Positive Electrode Current Collector and Negative Electrode Current Collector Various materials generally proposed for a battery or a capacitor can be employed as the material of the negative electrode current collector and the positive electrode current collector. For example, aluminum, stainless steel or the like can be used as the material of the positive electrode current collector. Stainless steel, copper, nickel, etc. can be used as the material of the negative electrode current collector. The open-percentage of the through-holes formed at each part on the positive electrode current collector and the negative electrode current collector is appropriately set according to the structures of the positive electrode, negative electrode, positive electrode current collector, negative electrode current collector, and electrode laminate unit. The shape of the through-holes is not particularly limited.

[D] Lithium Electrode

Various materials generally proposed as a current collector of a battery or a capacitor can be used as the material of the lithium-electrode current collector. Examples of these materials include a stainless steel, copper, nickel, or the like. The lithium-electrode current collector can have through-holes penetrating therethrough, such as an expanded metal, punching metal, etching foil, net, expanded member, etc. Instead of the metal lithium foil adhered onto the lithium electrode current collector, lithium-aluminum alloy, which can emit lithium ions, can be used.

[E] Separator

A porous member or the like having durability with respect to the electrolyte solution, positive-electrode active material, negative-electrode active material, or the like, having an open cell and having no electron conductivity can be used for the separator. Generally, a cloth, nonwoven fabric, or porous body made of paper (cellulose), glass fiber, polyethylene, polypropylene, etc. is used. The thickness of the separator may appropriately be set considering the holding amount of the electrolyte solution, strength of the separator, or the like. The thickness of the separator is preferably thin in order to lower the internal resistance of the electric storage device.

[F] Electrolyte Solution

It is preferable that an aprotic organic solvent containing a lithium salt is used for the electrolyte solution from the viewpoint that an electrolysis is not produced even by a high voltage and lithium ions can stably be present. Examples of the aprotic organic solvent include ethylene carbonate, propylene carbonate, dimethyl carbonate, diethyl carbonate, γ-butylolactone, acetonitrile, dimethoxyethane, tetrahydrofuran, dioxolane, methylene chloride, sulfolane, etc., wherein these material are used singly or mixed with one another. Examples of the lithium salt include $LiClO_4$, $LiAsF_6$, $LiBF_4$, $LiPF_6$, $LiN(C_2F_5SO_2)_2$, etc. Further, the concentration of the electrolyte in the electrolyte solution is preferably set to at least 0.1 mol/L or more, and more preferably set within the range of 0.5 to 1.5 mol/L, in order to lower the internal resistance due to the electrolyte solution.

Ionic liquid can be employed instead of the organic solvent. The combination of various cations and anions is proposed as the ionic liquid. Examples of the cations include N-methyl-N-propylpiperidinium (PP13), 1-ethyl-3-methyl-imidazolium (EMI), diethyl-methyl-2-methoxyethyl-ammonium (DEME), etc. Examples of the anions include bis (fluorosulfonyl)-imide (FSI), bis(trifluoromethanesulfonyl)-imide (TFSI), $PF_6^-$—$BF_4^-$, etc.

[G] Outer Casing

Various materials generally used for a battery can be used for the outer casing. A metal material such as iron or aluminum can be used, and a film material or the like made of resin can be used. The shape of the outer casing is not particularly limited. The outer casing may be formed into a shape appropriately selected according to the purpose, such as a cylindrical shape or rectangular shape. From the viewpoint of miniaturization or lowered weight of the electric storage device, it is preferable to use the film-type outer casing employing an aluminum laminate film. In general, a three-layered laminate film having a nylon film at the outer part, an aluminum foil at the middle part, and an adhesive layer such as a denatured polypropylene at the inner part is used.

The present invention is not limited to the aforesaid embodiments, and various modifications are possible without departing from the scope of the present invention. For example, the electrode obtained by the production process of the present invention can be applied not only to the lithium ion battery or lithium ion capacitor but also to various types of batteries or capacitors. The present invention is described for the laminate-type electric storage device. However, the present invention is not limited to the laminate-type, but can be applicable to a wound-type electric storage device. The ions pre-doped into the negative electrode are not limited to the lithium ions, but can be sodium ions or calcium ions.

What is claimed is:

1. An electric storage device comprising:
   an electrode having an electrode current collector, which is provided with plural through-holes, and an electrode mixture layer provided on the current collector; and
   an lithium electrode that has an lithium ion source and is connected to the electrode current collector for supplying lithium ions to the electrode mixture layer,
   wherein the current collector has a connection part that is connected to the lithium electrode, and has an aperture ratio of the through-holes getting continuously smaller toward the connection part.

2. The electric storage device according to claim 1, wherein the current collector has an edge part and a center part, and the aperture ratio of the edge part is set smaller than that of the center part.

3. The electric storage device according to claim 1, wherein the aperture ratio is changed toward the connection part at a predetermined multi-levels.

4. The electric storage device according to claim 1, wherein the aperture ratio is changed by changing space between the adjacent through-holes.

5. The electric storage device according to claim 1, wherein the aperture ratio is changed by changing size of the through-holes.

6. The electric storage device according to claim 1, wherein the electric storage device is pre-doped by supplying the lithium ions to the electrode mixture layer, and the ion is started to be pre-doped into the electrode by injecting an electrolyte solution.

* * * * *